US012045660B2

United States Patent
Lee et al.

(10) Patent No.: US 12,045,660 B2
(45) Date of Patent: Jul. 23, 2024

(54) METHOD AND APPARATUS FOR A CONFIGURABLE HARDWARE ACCELERATOR

(71) Applicants: Chang Hoon Lee, Montréal (CA); Paul Alepin, Montréal (CA); John Edward Vincent, Ottawa (CA)

(72) Inventors: Chang Hoon Lee, Montréal (CA); Paul Alepin, Montréal (CA); John Edward Vincent, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 905 days.

(21) Appl. No.: 17/032,103

(22) Filed: Sep. 25, 2020

(65) Prior Publication Data
US 2022/0100575 A1 Mar. 31, 2022

(51) Int. Cl.
*G06F 9/50* (2006.01)
*G06F 3/06* (2006.01)
*G06F 13/28* (2006.01)

(52) U.S. Cl.
CPC .......... *G06F 9/5044* (2013.01); *G06F 3/0604* (2013.01); *G06F 3/064* (2013.01); *G06F 3/0673* (2013.01); *G06F 9/5016* (2013.01); *G06F 13/28* (2013.01)

(58) Field of Classification Search
CPC ...... G06F 9/5044; G06F 3/0604; G06F 3/064; G06F 3/0673; G06F 9/5016; G06F 13/28
See application file for complete search history.

(56) References Cited

U.S. PATENT DOCUMENTS

| | | | |
|---|---|---|---|
| 10,303,630 B2 | 5/2019 | Lee | |
| 2013/0145373 A1 | 6/2013 | Noro | |
| 2014/0281366 A1* | 9/2014 | Felch | G06F 9/30123 711/207 |
| 2014/0281472 A1 | 9/2014 | Yalamanchili | |
| 2017/0031619 A1* | 2/2017 | Luan | G06F 3/0673 |
| 2017/0206169 A1 | 7/2017 | Coppola et al. | |
| 2019/0007334 A1* | 1/2019 | Guim Bernat | H04L 67/568 |
| 2019/0108152 A1* | 4/2019 | Lee | G06F 9/5038 |
| 2019/0303159 A1 | 10/2019 | Fryman et al. | |
| 2020/0201690 A1 | 6/2020 | Sankaralingam et al. | |

FOREIGN PATENT DOCUMENTS

| | | |
|---|---|---|
| CN | 104375972 A | 2/2015 |
| WO | 2017048656 A1 | 3/2017 |

OTHER PUBLICATIONS

Cedric Nugteren et al., "High Performance Predictable Histogramming on GPUs: Exploring and Evaluating Algorithm Trade offs", Mar. 5, 2011, total: 8pages.

* cited by examiner

*Primary Examiner* — Sisley N Kim

(57) ABSTRACT

Method and apparatus for process accelerator (PA) using configurable hardware accelerators is provided. The PA can include a plurality of processing elements (PEs). The PEs of the PA can be used to accelerate a process and/or one or more threads. PEs can include PE local memory which due to the memories' close physical proximity to the PE can result in reduced energy consumption. The plurality of PEs can be daisy-chain connected or DMA mode can be used to write the result of a PE directly into the PE local memory of another PE for further processing.

20 Claims, 6 Drawing Sheets

- PRIOR ART -

500

Processing, by a processing element (PE), a PE virtual group function code (VGFC) map row wherein a functional code field included in the VGFC map row is enabled.
510

Configuring, by the PE, a second PE enabled by a PE enable field included in the VGFC map row processed by the PE.
520

Configuring the second PE using a PE Program addressed by a memory address included in the PE program address (PPA) field of the VGFC.
530

FIG. 5

METHOD AND APPARATUS FOR A CONFIGURABLE HARDWARE ACCELERATOR

FIELD OF THE INVENTION

The present invention pertains to the field of process accelerators.

BACKGROUND

Process accelerators are used to reduce the time required to develop a process. This time is reduced by executing the process using specialized reconfigurable hardware rather than executing this process using a general purpose processor. Executing a process using specialized processors is known to those skilled in the art as process acceleration.

Unfortunately current process accelerators suffer from high power consumption and low performance due to sub-optimal use of the reconfigurable hardware used to accelerate the process.

Reconfigurable hardware is typically classified as having either coarse grain reconfigurable architecture or a fine grain reconfigurable architecture. The elements of coarse grain reconfigurable architectures can include circuits such as adders, multipliers, arithmetic logic units (ALU), and specialized processors that can be directly mapped to the process being accelerated. Fine grain reconfigurable architectures however can include lower level elements that can be grouped together to form the higher level elements required to accelerate the process. As a result, fine grain reconfigurable architectures may have lower performance and expend more energy than coarse grain reconfigurable architectures due to the inefficiencies associated with routing resources and configuration overhead associated with grouping lower level elements together. Fine grain reconfigurable architectures can also have lower performance and higher power consumption because grouping lower level elements usually results in sub-optimal higher level elements relative to the coarse grain reconfigurable architectures' higher level elements that have been optimized for speed and power efficiency.

There exists a need for a process accelerator which is more efficient and utilizes less power than prior art devices.

The foregoing background information is provided to reveal information believed by the applicant to be of possible relevance to the present disclosure. No admission is necessarily intended, nor should be construed, that any of the preceding information constitutes prior art against the present disclosure.

SUMMARY

An aspect of the present disclosure provides a configurable hardware accelerator (CHA). This CHA can include a configurable processing entity, such as a processing element (PE). The PE can include a CHA engine, M PE local memory banks, and a control block. The CHA engine can include K processors and each of the K processors can include M configurable cores with each of the M configurable cores configured in hardware to execute a thread of the process being hardware accelerated. Each of the M configurable cores can be associated with one of the M PE local memory banks. The control block can be used for controlling each one of the M configurable core's access to its associated PE local memory bank.

In some embodiments of the processing element, each of the M configurable cores can be configured in hardware for execution of a process thread by executing a PE program. The PE program can configure hardware elements within each of the M configurable cores.

In some embodiments of the processing element, the number of M PE local memory banks can be equal to the number of parallel threads supported by the M configurable cores.

In some embodiments of the processing element, a thread can include instructions executed by the M configurable cores and also include data executed by the M configurable cores.

In some embodiments of the processing element, the control block can control each of the M configurable core's accesses by generating addresses used to address configuration instructions and address data stored in the configurable core's respective PE local memory bank.

In some embodiments of the processing element, the data processed by the M configurable cores can include N data packets corresponding to a number of parallel threads executed by the M configurable cores or N results corresponding to the number of parallel threads executed by the M configurable cores.

In some embodiments of the processing element, the control block can control each of the configurable core's accesses by generating addresses used by the configurable cores to write the configurable core's result into the configurable core's respective PE local memory bank.

In some embodiments of the processing element, one or more processors are daisy-chain connected. The daisy-chain is formed by connecting an output stream of a first processor to the input stream of a second adjacent processor.

A further aspect of the present disclosure provides a configurable hardware accelerator (CHA). The CHA can be comprised of a plurality of processing elements (PEs) and non-transitory memory. The non-transitory memory can be configured to store a PE virtual group function code (VGFC) table. The PE VGFC table can be configured to define one or more PE virtual groups (PEVGs) and each of the PEVGs can be configured in hardware for execution of a process.

In some embodiments of the CHA, the CHA can further comprise a system interconnect (SI). The PE VGFC table stored in the CHA's non-transitory memory can include one or more pointers. Each pointer can address one PE program and the PE programs addressed by the pointers can be used to configure the SI so that each PE can communicate with other PEs and also non-transitory memory. Each PE can also include M cores and M PE local memory banks. Each of these cores can be associated with one of the local memory banks.

In some embodiments of the CHA, the process executed by the plurality of PEs can include execution of the process or execution of a thread of the process.

In some embodiments of the CHA, the PE VGFC table can be used to configure each PE so that each configured PE can communicate with other PEs included in the same PEVG.

In some embodiments of the CHA, the VGFC table can include one or more PE enable fields that can be used to select one or more PEs to include in the PEVG.

In some embodiments of the CHA, the plurality of PEs can be daisy-chain connected to process one or more threads of the same process.

In some embodiments of the CHA, daisy-chain connected PEs can be PEs where the output stream of a first PE can be connected to the input stream of a second adjacent PE.

In some embodiments of the CHA, the plurality of PEs can use direct memory access (DMA).

In some embodiments of the CHA, the result generated by a first PE using DMA can be written directly into the local shared data/instruction memory (SDIM) of a second PE using DMA.

In some embodiments of the CHA, a single cluster PEVG can be comprised of a plurality of PEs of the single cluster and one or more other PEs included in the same single cluster.

In some embodiments of the CHA, a single cluster can include one or more PEVGs.

In some embodiments of the CHA, a plurality of clusters of the PEVGs can be comprised of a plurality of PEs of a first cluster and one or more other PEs of a second cluster. The first cluster and the second cluster are different clusters.

A further aspect of the present disclosure provides a method comprising processing performed by a processing element (PE) and also the PE configuring a second PE. The PE can process a PE virtual group function code (VGFC) table row when the functional code field included in the VGFC table row is enabled. The PE can configure a second PE when the second PE is enabled by a PE enable field included in the VGFC table row. The second PE can be configured using a PE program addressed by a memory address included in the PE program address field of the VGFC table.

BRIEF DESCRIPTION OF THE FIGURES

Further features and advantages of the present disclosure will be apparent from the following detailed description, taken in combination with the appended drawings, in which:

FIG. 5 illustrates a PE virtual group configuration method.

Throughout the appended drawings, like features are identified by like reference numerals.

DETAILED DESCRIPTION

In various embodiments devices having a computational architecture (CA) using configurable hardware accelerators to accelerate instances of computer programs, also known as processes, is provided.

Figure 1:
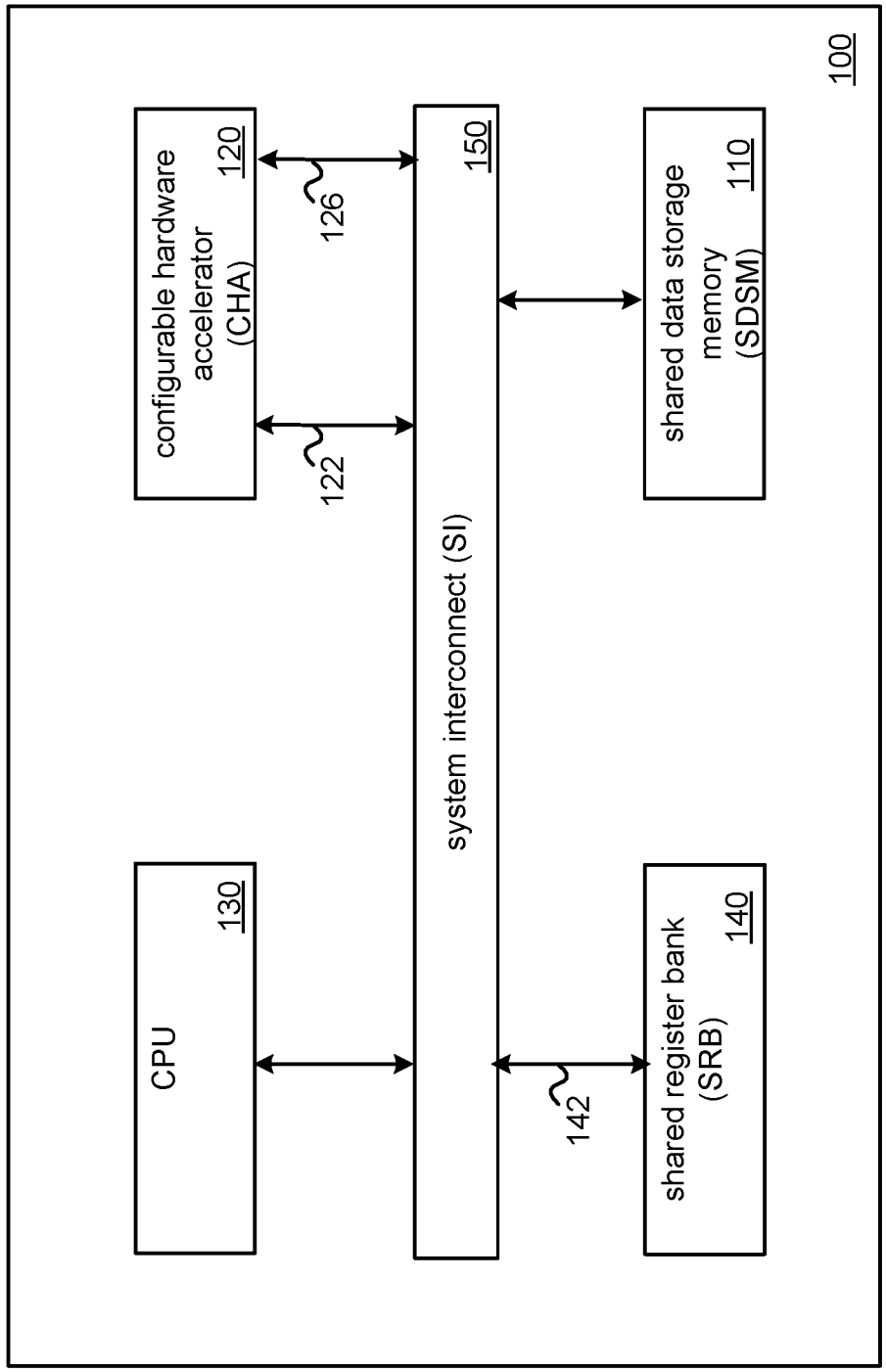
FIG. 1 illustrates a schematic representation of a reconfigurable architecture (hereafter referred to as an RA).

FIG. 1 illustrates a schematic view of prior art RA device 100. As shown in FIG. 1, RA device 100 includes shared data storage memory (hereafter referred to as a SDSM) 110, CHA 120, CPU 130, shared register bank (hereafter referred to as an SRB) 140, and system interconnect (hereafter referred to as an SI) 150.

CHA 120 can include one or more PEs where these PEs can be used to accelerate a process. SI 150 interconnects CPU 130, the PEs included in CHA 120, registers included in SRB 140, and memories included in SDSM 110.

SRB 140 can also include one or more banks of configuration registers that can be used to store information. The information stored in SRB 140's configuration registers are accessed using SI 150 and connection 142.

SDSM 110 can include more than one memory location organized in more than one bank. The memories comprising SDSM 110 can be used to store data, operands, and PE programs. However, such an arrangement requires the PE(s) of CHA 120 to access the memories of SDSM 110 via the SI 150, causing delays and increased power consumption.

Figure 2A:
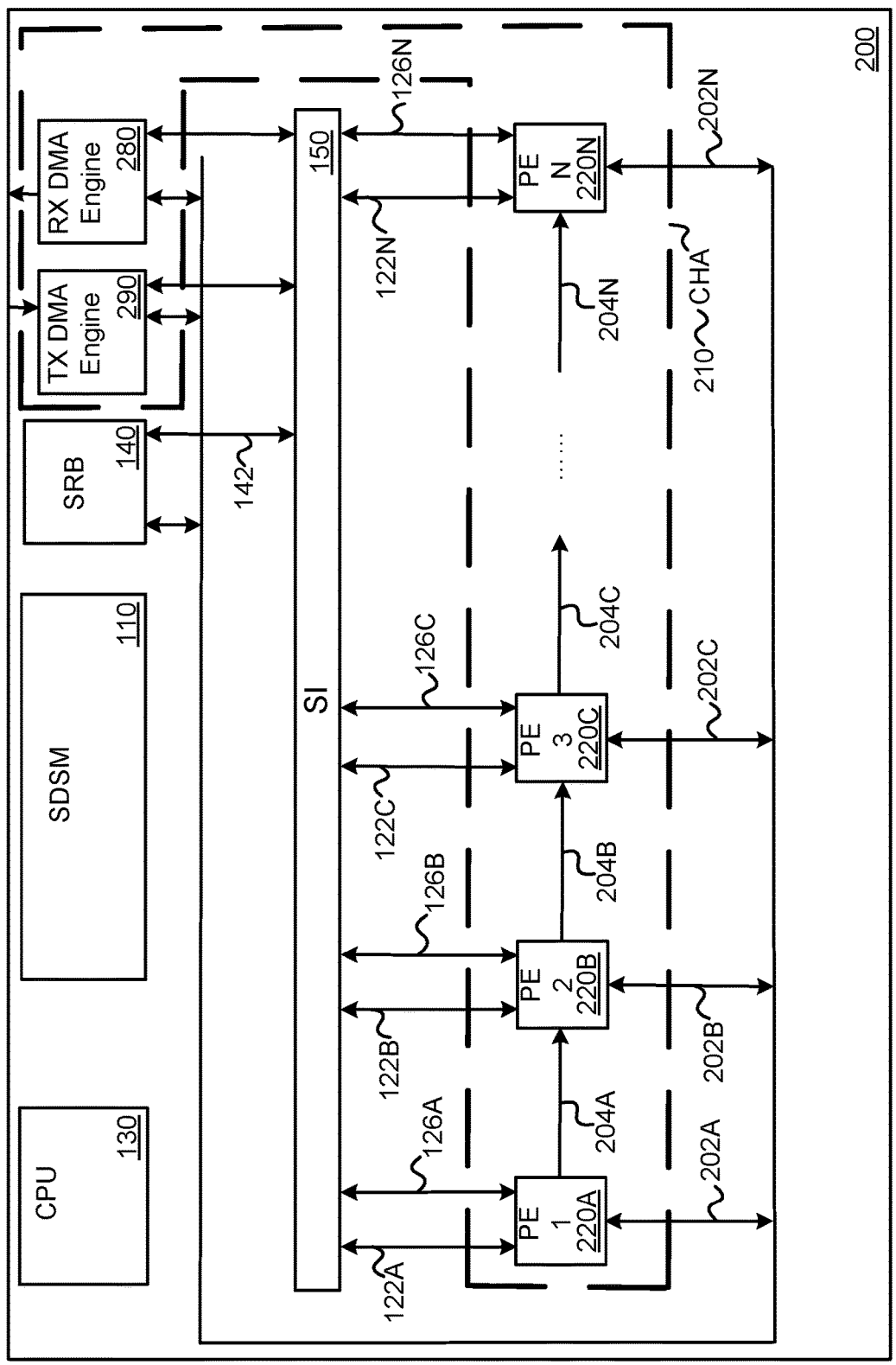
FIG. 2A illustrates a process accelerator (hereafter referred to as a PA) with a configurable hardware accelerator (hereafter referred to as a CHA). This figure also illustrates the major functional blocks within a CHA.

FIG. 2A illustrates PA device 200 according to an embodiment of the disclosure. PA device 200 can include a CHA that can in turn include K processors that can be used to execute a process. Each processor can include M configurable cores with each of these M configurable cores configured in hardware for execution of a thread of a process. In other embodiments PA device can include a CHA that can in turn include K processors that can include M reconfigurable cores. A non-limiting example of an advantage of reconfigurable cores over configurable cores is that the reconfigurable cores can be reconfigured as needed to optimize acceleration of a specific process where configurable cores are configured once and as a result, not all processes will be accelerated as efficiently as other processes.

As shown in FIG. 2A, PA device 200 includes SDSM 110, CPU 130, SRB 140, and CHA 210 or minor variations thereof. CHA 210 can include PEs 220, transmit (TX) direct memory access (DMA) engine 290 and receive (RX) DMA engine 280. CHA 210 is an improvement over CHA 120 because PEs 220 included in CHA 210 can include PE local memories that can be used to store PE programs, data, and results. In some embodiments each PE 220 can use SI 150 to access the PE local memory of other PEs 220.

In this specification the term thread of a process is used to define a unit of execution within a process. A unit of execution, in this context refers to a single operation operating on one or more operands, or a set of linked operations which are closely coupled together and where each linked operation operates on one or more operands including the results from the previous operations. Non-limiting examples can include a single operation, such as addition or multiplication; or sets of operations which are commonly combined such as matrix inversion and a fast Fourier transform (FFT). It is noted that a process can be a single threaded process (includes a single thread) or a multi-threaded process (includes a plurality of threads). It should be appreciated that execution of a thread of a process by CHA is the action by which CHA uses one or more PEs to execute one or more threads of a process. The PE's include hardware elements configured to accelerate the one or more threads of a process when these one or more threads are executed by the PE. Non-limiting examples of these hardware elements can include adders, multipliers, and arithmetic logic units (hereafter referred to as ALUs).

In this specification the term operand is used to define one or more units of data operated on by an operation. In this specification the term linked operands is used to define a plurality of operands operated on by a set of operations. Threads of a process can be comprised of one or more operands and/or one or more linked operands.

In this specification the term acceleration is used to define the use of computer hardware that is specifically made to perform thread execution more efficiently than is possible using software executed on a general purpose processor to perform thread execution.

RX DMA engine 280 and TX DMA engine 290 can be used by PA device 200 to communicate with another PA device (not shown). This communication can include using one or more PEs included in this other PA device to further process results generated by one or more PE 220s included in PA device 200.

Figure 2B:
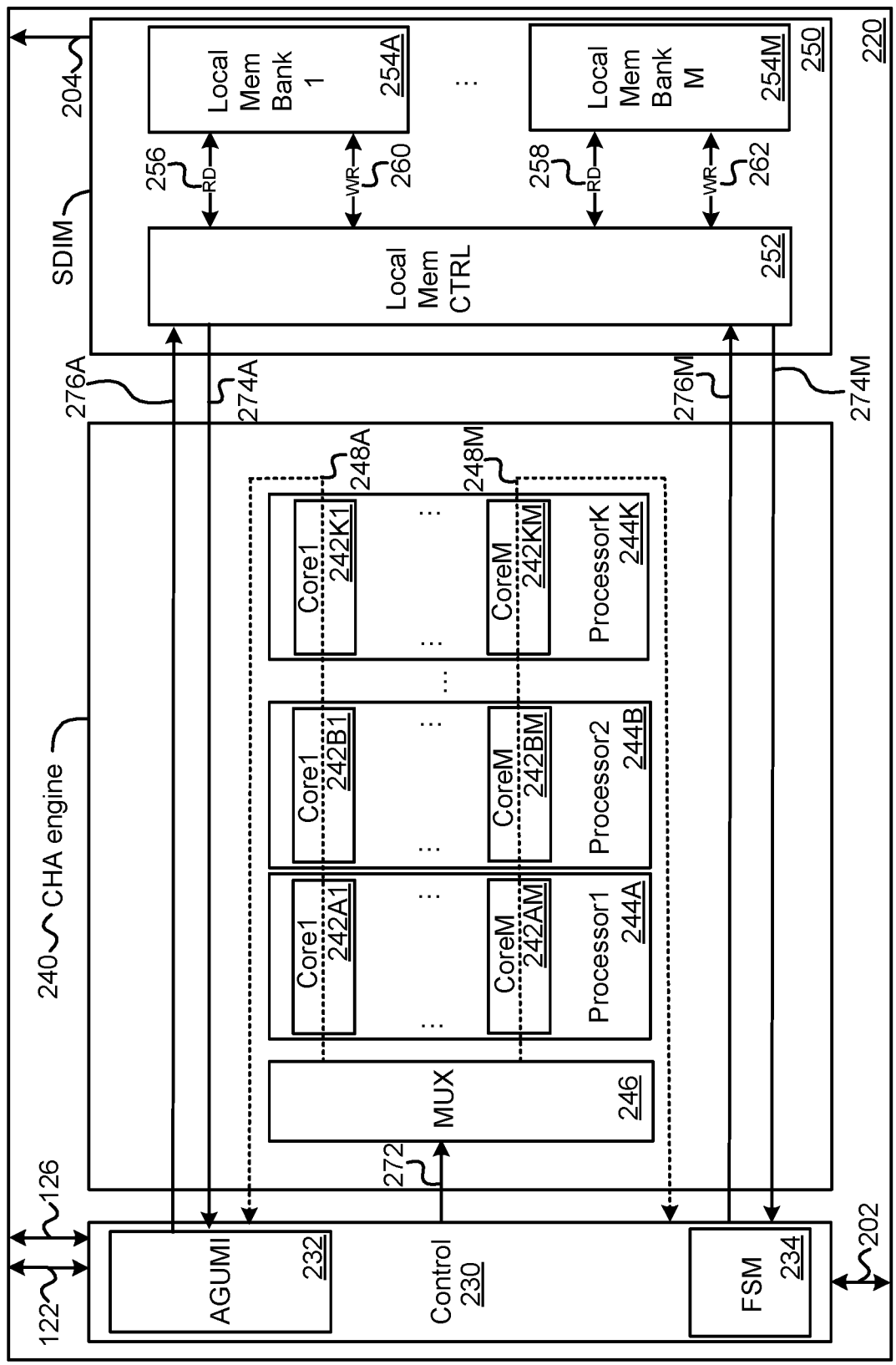
FIG. 2B illustrates the major functional blocks within a processing element (hereafter referred to as a PE).

FIG. 2B illustrates the major functional blocks that can be included in PE 220 according to an embodiment of the disclosure. These blocks can include control 230, CHA engine 240, and shared data/instruction memory (hereafter referred to as a SDIM) 250. Control 230 can include address generation unit memory interface (hereafter referred to as AGUMI) 232 and finite state machine (hereafter referred to as FSM) 234. CHA engine 240 can include multiplexor (hereafter referred to as MUX) 246, and K processors 244 where each processor 244 can include M processor cores (hereafter referred to as cores) 242. SDIM 250 can include local memory controller (hereafter referred to as local memory CTRL) 252 and M local memory banks (hereafter referred to as local mem bank) 254.

In this specification the term CHA engine is used to define a grouping of elements used to accelerate one of more threads of a process. The CHA engine can include a MUX and also a collection of processors and cores. The MUX receives a process and then decompose this process into a plurality of threads. This plurality of threads is then passed to the cores for acceleration.

PE programs can include a plurality of instructions that can be used to configure control 230 and can also be used to configure cores 242. Operands however can be an initial packet of data processed by cores 242.

In this specification the term PE program is used to define a set of instructions that can be used to configure hardware elements included in one or more cores. It is noted that execution of a PE program by a core can cause the core to use the set of instructions to configure the hardware elements of one or more other cores included in one or more PEs. It can also be noted that execution of the PE program by a core can cause the core to use the set of instructions to configure a PE's address generation logic. A non-limiting example can include a first core included in cores 242 that execute a PE program to configure the hardware elements of one or more other cores 242 included in the same PE. A second non-limiting example can include the first core that executes a PE program to configure the address generation logic included in the PE's AGUMI 232 and FSM 234.

Some PE programs can cause CHA 210 to load data from a first location of any combination of SDSM 110 and the PE local memories of CHA 210. PE programs can also cause the same data to be written into a second location of any combination of SDSM 110 and the PE local memories of CHA 210.

Some PE programs can be used to configure one or more cores 242 with hardware elements to execute threads. Accordingly, the PE programs configure hardware elements within the core to execute threads. As stated above non-limiting examples can include a single operation, such as addition or multiplication; or sets of operations which are commonly combined such as matrix inversion and a fast Fourier transform (FFT).

Once configured, cores 242 can accelerate execution of processes and/or one or more threads. A person skilled in the art will appreciate that a process can be made up of one or more sub-parts, wherein these sub-parts are known to a person skilled in the art as a thread. A person skilled in the art will also appreciate that threads can also be independent and separate from a process. A person skilled in the art will also appreciate that these one or more threads can be accelerated either one after another (serially) or all accelerated at the same time (concurrently and in parallel) under the control of a PE program.

While accelerating a process and/or one of more threads, CHA 210 can read data and/or operands from SDSM 110, read data and/or operands from the one or more PE local memories included in CHA 210, process data and/or operands streamed from any combination of SDSM 110 and one or more PE local memories included in CHA 210, and can write the result of data and/or operands into any combination of SDSM 110 and one or more PE local memories included in CHA 210.

CHA 210 can access this data, operands and these PE programs by reading a single memory location or burst reading more than one memory location. CHA 210 can also write results into a single memory location or burst write results into more than one memory location. In other embodiments burst read and burst write operations are continuous and uninterrupted operations that may also be referred to as streamed, streaming operations, or streaming.

CHA 210 can be configured to perform operations on operands and/or data streamed from SDSM 110 and/or one or more PE local memories included in CHA 210. These operations can include arithmetic operations. Operating on streamed operands and/or data is more flexible than performing specific and pre-set arithmetic functions on non-stream operands and/or data. Streamed operands and/or data are stream read using an uninterrupted burst read from any combination of SDSM 110 and one or more PE local memories included in CHA 210.

CHA 210 can also perform arithmetic operations operating on multiple operands, operations on scalar or vector data, bit manipulation operations, and control instructions. These operands, data, and instructions can be included in a process and/or one or more threads of a process.

Multiple operands can be read from any combination of SDSM 110's memory locations and PE local memories included in CHA 210. CHA 210 can process these multiple operands by daisy-chaining them together without the assistance of CPU 130.

PEs included in CHA 210 can process operands and/or data that can comprise a process and/or one or more threads. Each PE can include CHA engine 240 which in turn can include one or more daisy-chain connected processors 244 that in turn can include a plurality of cores 242. The daisy-chain connected processors 244 are connected such that the output stream of one or more processors is connected to the input stream of a second adjacent processor included in the daisy-chain.

PE 220 is an improvement over configurable hardware accelerator (granted patent number U.S. Pat. No. 10,303,630 B2) because PE 220 includes PE local memory.

PA device 200's CHA 210 can include N PEs 220 (e.g.: PE1 220A, PE2 220B, PE3 220C, and PEN 220N) used to process streaming data and also non-streaming data that can comprise a process and/or one or more threads.

A person skilled in the art will appreciate that PEs 220 included in PA device 200 can be collectively referred to as a cluster.

In order for PA device 200 to accelerate a process quickly and in an energy efficient manner, PA device 200 can decompose the process into a plurality of threads. PA device 200 can include N PEs 220 (PE 1 220A, PE 2 220B, PE 3 220C, PE N 220N) where each PE can include K processors 244 (processor1 244A, processor 2 244B, processorK 244K) where each PE can in turn include a M configurable cores 242 (core1 242A1, coreM 242AM, core 1 242B1, coreM 242BM, core1 242K1, coreM 242KM). The processors can be daisy-chain connected. Cores 242 included in CHA 210 can accelerate a process and/or one or more threads either sequentially and/or at the same time and in parallel. The maximum number of threads that can be accelerated at the same time and in parallel is limited by the number of cores 242 instantiated in each processor 244 included in CHA 210. CHA 210 instantiates M cores 242 (Core1 242A1, CoreM 242AM) in each processor 244 (Processor1 244A, Processor2 244B, Processor K 244K) and therefore PA device 200 can process a maximum of M threads simultaneously.

PE 220 can operate in either daisy-chain or DMA mode. Daisy-chain mode and DMA mode can be used when the process and/or one or more threads that are being accelerated requires more cores 242 than the number of cores 242 available in a single PE 220. In daisy-chain mode, these processes and/or one or more threads can be distributed across multiple daisy-chained PE 220s. Also, the output stream of PE 220 can be connected to the input stream of an adjacent PE 220. Daisy-chaining a plurality of PEs 220 offers the advantage of faster acceleration of a process and/or one or more threads by streaming the process and/or threads across multiple PEs 220 without temporarily buffering the intermediate result. Data buffering is used in DMA mode for processes and/or one or more threads that require intermediate results to be stored. When data is buffered in DMA mode, a PE 220 can be configured to write its result directly into one or more SDSMs 110 and/or one or more memory locations of PE local memory 254. In the DMA configuration, the sending PE, after finishing the DMA transfer, sends a signal to the receiving PE indicating the availability of data. Subsequently, the receiving PE can start its program execution using the received data. Buffering the intermediate result yields a slower execution speed than daisy-chain mode. However, DMA mode offers the flexibility of linking a PE to any other PE to form a processing chain used to accelerate one or more processes and/or one or more threads.

Control 230 controls access to PE local memory 254 included in SDIM 250. Control 230 includes AGUMI 232 and FSM 234. AGUMI 232 can generate M memory read request addresses at the same time. Each read request address generated corresponds to each thread of M threads accelerated. AGUMI 232 can also provide these addresses to local SDIM 250 using M memory request connections (e.g. 276A, 276M) to read data, operands and/or PE programs. These data, operands and PE programs can be used by one or more threads of the process being accelerated. The PE programs can include configuration instructions. The data can include one or more threads accelerated in parallel by the configurable cores. The configurable cores accelerating these threads in parallel will generate one result for each thread accelerated where the results can include multiple data sets.

Control 230 of PA device 200 is an improvement with respect to RA device 100 of configurable hardware accelerator (granted U.S. Pat. No. 10,303,630 B2) in that control 230 can address memory locations included in PE local memory and also memory locations included in SDSM 110.

PE programs read from any combination of SDSM 110 and the PE local memory 254 included in CHA 210 are used to configure AGUMI 232 and FSM 234. AGUMI 232 and FSM 234 are configured to address memory locations in any combination of SDSM 110 and PE local memory 254. These addressed memory locations can be used to store operands and/or results. PE programs can also be used to program cores 242 with hardware elements used by a unit of execution.

Once configuration is completed, operands included in threads can be streamed to the cores for processing.

In other embodiments cores can be programmed when a new operand and/or data stream is applied to the core. Also, cores can retain the same programming for the duration of the data stream.

FSM 234 and AGUMI 232 can generate the addresses of memory locations that can store operands and data and also the addresses of memory locations where results are written (known to those skilled in the art as the result destination memory location). AGUMI 232 can apply these addresses to M memory request lines (e.g.: 276A, 276M) connected to SDIM 250. SDIM 250 can return the data read from these addresses to control 230 using M memory response lines (e.g.: 274A, 274M). FSM 234 and AGUMI 232 can apply this data to MUX 246 of CHA engine 240 using bus 272. MUX 246 can in turn provide this data to any combination of M cores 242 of K processors 244 (e.g.: Processor1 244A's Core1 242A1 up to and including CoreM 242AM; Processor2 244B's Core1 242B1 up to and including CoreM 242BM; ProcessorK 244k's Core1 242K1 up to and including CoreM 242KM) to accelerate as many as M threads. The result data that results from accelerating these M threads is passed to control 230 using connections 248A through 248M. Control 230 in turn writes this result data into memory locations of any combination of PE local memory bank 1 up to and including PE local memory bank M (e.g.: 254A to 254M) or SDSM 110 memory location. Control 230 writes these results using a maximum of M memory request lines (e.g.: 276A to 276M).

SDIM 250 can also include local memory controller 252 and M PE local memory banks (e.g.: 254A to 254M). Each of the M cores is associated with one of the M PE local memory banks to support a maximum of M threads processed by M cores 244 where these M cores 244 can be included in one processor of K processors 244. These M PE local memories can include true dual port memories and/or two port memories. Therefore, operands can be read from these PE local memories using a dedicated read bus (RD) (e.g.: 256, 258) and result data can be written into these memories at the same time and to the same address using a dedicated write bus (WR) (e.g.: 260, 262). Local memory controller 252 includes address collision detection logic that can ensure that the proper operands and/or data are read from these PE local memories when memory locations in these PE local memories are written to and read from simultaneously. Local memory controller 252 includes this address collision detection logic to allow PA device 200 to easily support units of execution which can include matrix inversion. Local memory controller 252 can also throttle the operand read by monitoring the results written into these PE local memories when supporting back-substitution procedures.

SDIM 250 of PA device 200 is an improvement over RA device 100 of configurable hardware accelerator (granted patent number U.S. Pat. No. 10,303,630 B2) because SDIM 250 includes PE local memories that can be physically co-located in close proximity to the M cores 242 included in K processors 244. Data, PE programs and operands stored in these physical co-located memories reduces the distance these data, PE programs and operands travel and, as a result, reduces energy consumption.

In this specification the term PE virtual group function code (PEVG) map is used to define a group of PEs used to accelerate a process. As a non-limiting example, the PEVG map can be used to include PEs from one or more clusters in the group of PEs used to accelerate a process. The PEVG map also allows both pipelined process as well as distributed processes to be accelerated.

Figure 3:
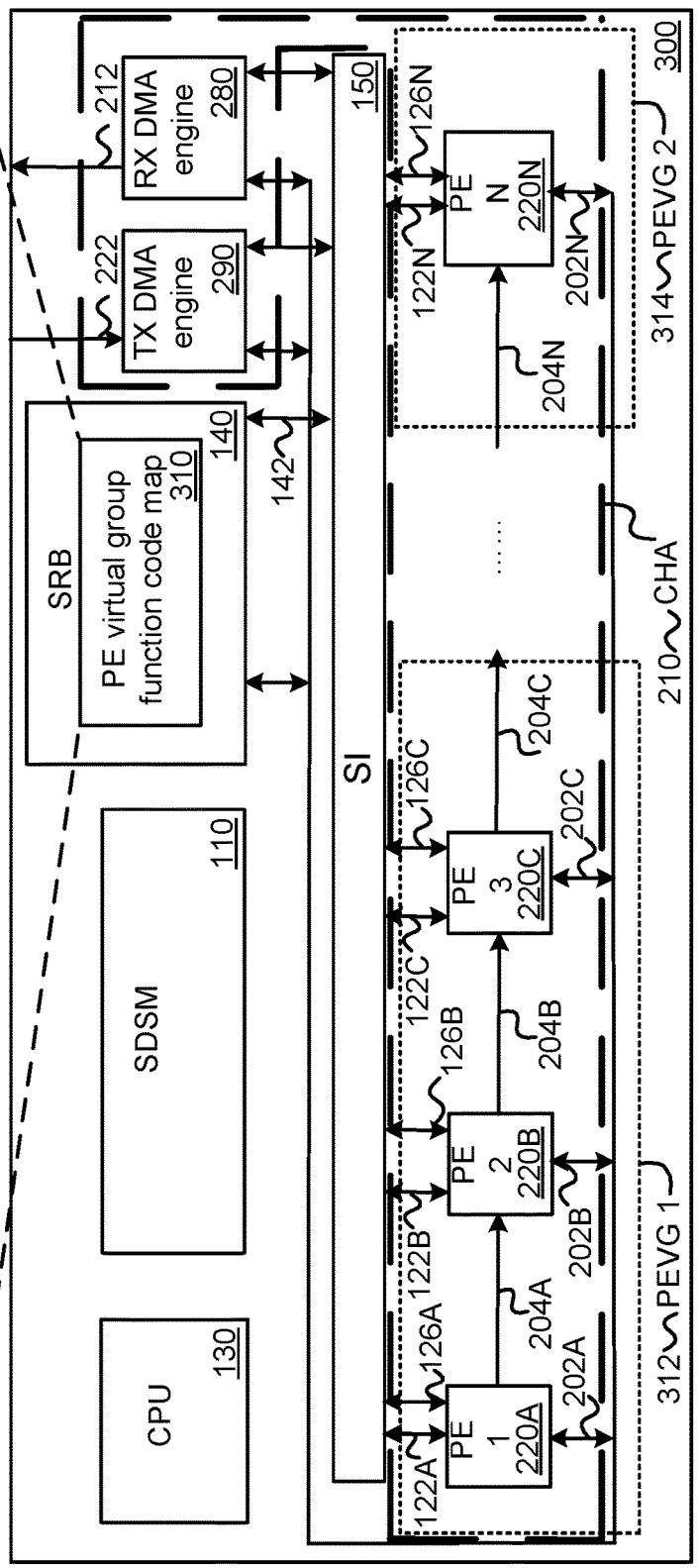
FIG. 3 illustrates the fields of a PE virtual group function code map.

FIG. 3 illustrates PE virtual group function code (hereafter referred to as a VGFC) table 310 according to an embodiment of the disclosure. VGFC table 310 can be used to define one or more virtual grouping of PEs where these PEs are configured in hardware for execution of the process and/or one or more threads. VGFC table 310 can be stored in a plurality of SBR 140's registers. The VGFC table can include parameters used to configure PE groupings. Any combination of CPU 130 and PE 220 can use these VGFC table parameters to configure PE groupings. This grouping can be referred to as a PE virtual group (hereafter referred to as a PEVG) and those skilled in the art will appreciate that the PEs included in the PEVG can be included in a single cluster. A PEVG can include pointers where each pointer can address a PE program used to configure the SI so that each PE can communicate with one or more other PEs and also non-transient memory included in any combination of SSDM 110 and/or PE local memory.

VGFC map 310 can be used to define one or more PEVGs. Each PE in the PEVG accelerates a part of one or more pipelined and/or distributed processes and/or one or more threads. FIG. 3 illustrates an example of two PEVGs (e.g.: PEVG1 312, PEVG 2 314) that can be configured using VGFC map 310.

In other embodiments multiple PEs in the same PEVG can be either daisy-chain connected PEs or PEs accelerating processes and/or one or more threads using DMA mode. Multiple PEs in the same PEVG can be connected in any serial or parallel fashion using SI 150, master interface 122 and slave interface 126 to communicate with each other. A person skilled in the art will appreciate that PEs that use DMA mode in a PEVG can be connected in any order. In a non-limiting example of PEs using DMA mode, PE1 can process the data applied to it and then transmit its result to PE 20 which in turn passes its result to PE 5.

It should also be appreciated that all PEs in a PEVG can directly address the SDIM 250 of every other PE in the same PEVG. A person skilled in the art will appreciate that DMA is faster than CPU interrupt memory accesses because accessing a memory directly requires less clock cycles than accessing a memory using one or more CPU interrupts.

As shown in FIG. 3, VGFC map 310 can be comprised of registers included in SRB 140. SRB 140's registers include a function code (FC) (e.g.: 412, 414, 416) associated with a PEVG, the PE's program address (e.g.: 382, 362, 342, 322, 384, 364, 344, 324, 386, 366, 346, 326), and an enable bit for each PE (e.g.: 392, 372, 352, 332, 394, 374, 354, 334, 396, 376, 356, 336) in a cluster.

Each PE VGFC map 310 row address can be associated with an FC and the row data can include an enable bit and one or more PE program addresses that can be used to define a PEVG. As a non-limiting example, PEVG 1 312 can be defined by FC 1 412, F(1)EN3 372, F(1)PE3 362, F(1)EN2 352, F(1)PE2 342, F(1)EN1 332, and F(1)PE1 322 and PEVG 2 314 can be defined by FC N 416, F(N)ENN 396, and F(N)PEN 386.

Each PE has an enable bit (e.g.: 392, 372, 352, 332, 394, 374, 354, 334, 396, 376, 356, 336). Writing a logic one into one or more PE enable bits can cause the one or more PEs associated with the enable bit to be included in the PEs used to accelerate processes and/or one or more threads. These enables can be used to configure SI 150 to interconnect PEs.

The address of the PE program stored in either SDSM 110 or PE local memory of PE 220 is pointed to by writing the address into the PE program address (hereafter referred to as the PPA) field. As a non-limiting example, if the processes and/or one or more threads being hardware accelerated requires the PEVG associated with FC 1 to cause PE 1 220A to execute a FIR Filter and PE 2 220B to execute a FFT on the result generated by PE 1 220A:

1. Write a logic one to F(1)EN1 332 (PE 1 enable).
2. Write a logic one to F(1)EN2 352 (PE 2 enable).
3. Write logic zero to all other PE enables 372, 392, 334, 354, 374, 394, 336, 356, 376, 396.
4. The address of the PE FIR program stored in either SDSM 110 or PE local memory bank 1 254A up to PE local memory bank M 254M is stored in F(1)PE1 322.
5. The address of the PE FFT program stored in either SDSM 110 or PE local memory bank 1 254A up to PE local memory bank M 254M is stored in F(1)PE2 342.

A PEVG is selected to accelerate a process and/or one or more threads by writing a logic one into the register included in SRB 140 associated with FC (e.g. 412, 414, 416) in the PE VGFC map 310.

PE VGFC map 310 is initialized when a new process and/or one or more threads are accelerated and a new stream of operands and/or data is applied to the one or more PEs used for the acceleration. All PEs in the PEVG must be idle and able to accept new programming in order to be initialized. SRB 140 can be used to enable all PEs required to accelerate the process and/or one or more threads by writing a logic one to all required PE enables (e.g.: 392, 372, 352, 332, 394, 374, 354, 334, 396, 376, 356, 336) simultaneously.

CPU 130 can be used to create and pre-program VGFC map 310. Since VGFC map 310 is memory mapped and visible to other devices including the PEs, an external controller can modify VGFC map 310 using RX DMA engine 280. Also, the PE program stored in any combination of SDSM 110's and PE local memory 254 can be executed by a PE causing the PE executing the PE program to configure PEs and create one or more PEVGs included in VGFC map 310. One or more instructions in the PE program can be interpreted by the PE executing the PE program to configure PEs and create PEVGs. These PEVGs can be created using the following steps. The first step is to write a logic one into each PE enable (e.g.: 392, 372, 352, 332, 394, 374, 354, 334, 396, 376, 356, 336) associated with the PEs required to accelerate the process and/or one or more threads. The second step is to write logic zero into PE enables of the PEs not used for accelerating the process and/or one or more threads. The third step is to write the address of the memory location containing the PE program into the required (PPA) register(s) (e.g.: 382, 362, 342, 322, 384, 364, 344, 324, 386, 366, 346, 326) to program the PE associated with the PPA register. The last step is to write a logic one into the register included in SRB 140 associated with FC (e.g. 412, 414, and 416) included in PE VGFC map 310.

PAs can fall into one of two categories—configured once or configured frequently. Configuration frequency can be important because each time a PE is configured, power is consumed. Therefore PAs that can be configured once can have the lowest power consumption and PAs that can be frequently configured can have the highest power consumption. However, the low power consumption of a one-time configured PA can come at the cost of low flexibility. PAs that can be frequently configured can also offer increased flexibility and higher power consumption. The configuration of PEs included in PA device 200 is frequent compared to a one time configured PA because PEs are configured when a new PE program is executed. However, process and/or thread acceleration performed by the PA device 200 includes processing large sets of streaming data. Since the PEs included in PA device 200 are only configured once while processing these large sets of streaming data and as a result, PA device 200 can offer relatively lower power consumption and also high flexibility.

PA device 200 also reduces power consumption by prefetching the next PE program from either SDSM 110 or PE local memory 254 after the last operand or data has been read and is being processed. This method reduces the number of PE reconfigurations required without sacrificing performance.

A non-limiting example of a PE program initializing PE VGFC map 310 based on the previous example of PE1 220A executing a FIR followed by PE2 220B executing a FFT on the PE 1 220A's result data is as follows:

1. PE2 220B executes its PE program and is instructed to send a ready (RDY) using connection 202B to PE1 220A and awaits an interrupt indicating PE1 220A has completed processing and has generated a result. This interrupt is asserted using connection 202A.
2. PE1 220A executes its PE program and is instructed to wait for RDY of PE2 220B to be asserted using connection 202B
3. When PE1 220A detects PE2 220B's RDY is asserted using connection 202B PE1 220A executes the FIR algorithm, writes the data resulting from executing the FIR algorithm into memory included in PE2 220B using connection 204A, and generates an interrupt using connection 202A.
4. When PE2 220B detects PE1 220A has asserted an interrupt using connection 202A, PE2 220B executes the FFT algorithm using the data PE1 220A wrote into its memory.

In other embodiments a PE can write its result into the PE local memory of the next PE (e.g. 254A, 254M) that will process this result using any combination of direct connection (e.g.: daisy-chain connection) (e.g.: 204A, 204B, 204C, 204N) and master (122A, 122B, 122C, 122N)/slave (126A, 126B, 126C, 126N)/System Interconnect 150 or by using DMA.

In other embodiments the PE RDY and interrupts used by the PEs to communicate are simple hardware hand-shaking signals.

In other embodiments the PEs included in PA device 200 can be included in more than one PEVG. In a non-limiting example, PE2 220B can be part of a PEVG with FC 1 and also at the same time part of a PEVG with FC 2.

The architecture of PA device 200 can include a push model rather than a pull model. Those skilled in the art will appreciate that due to the push model, RAs from one cluster included in a PEVG can send their output to PEs in one or more other clusters included in the PEVG without the PEs in the one or more other clusters requesting the RAs send this output. Therefore, those skilled in the art will appreciate that PEVGs can include PEs included in more than one cluster.

Figure 4:
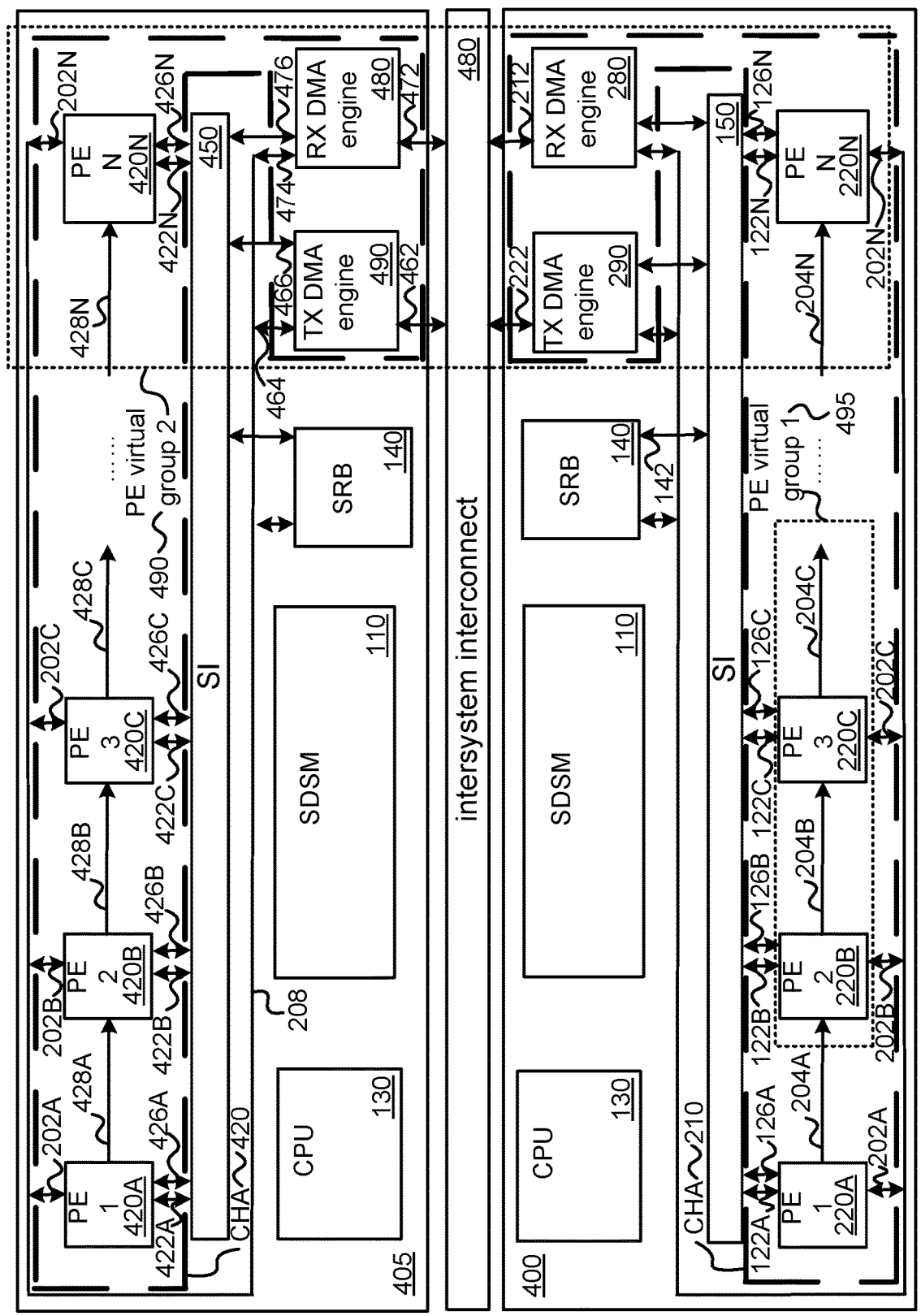
FIG. 4 illustrates multiple process accelerators.

FIG. 4 illustrates two PAs interconnected using intersystem interconnect 480 according to an embodiment of the disclosure. As illustrated by FIG. 4, DMA engines including RX DMA engine 280 and TX DMA engine 290 can be used for any combination of transmission or reception of operands, data and/or PE programs between PA device 400 and PA device 405 using intersystem interconnect 480. When a PE included in PA device 400 generates output data, this PE can use TX DMA engine 290 to write the output data into PA device 405's PE's PE local memories using connection 222, intersystem interconnect 480, connection 472, RX DMA engine 480, connection 476, and system interconnect 450.

PE programs contain all information necessary to direct movement of data and control messages.

The last PE in the PEVG executing the operands and processing data, where the operands are executed and data is processed by more than one PA, generates DMA transfer requests in order to transfer data to any combination of one or more PAs. This last PE also generates and sends a message to the one or more PAs that causes these one or more PAs to begin processing data.

In other embodiments a processor interconnect includes master and slave buses that may be used when performing any combination of reading and writing data from/to PEs in the same PA.

The PEVG can be configured using method 500 as illustrated by FIG. 5. Method 500 includes the PE processing the PE VGFC map 510. VGFC map includes a plurality of rows. Each VGFC map row can include a FC field and one or more PE enable fields and one or more PE PPA fields. The VGFC map row is enabled by writing a logic one into VGFC FC fields (412, 414, and 416). Enabled VGFC map rows are further processed to determine which PE is enabled. The PPA field of each enabled PE in the VGFC map row is further processed to determine the PE program stored in the memory location addressed by the memory address contained in the PPA field. These enabled PEs are then configured using the PE program addressed by the memory address stored in these PPA fields 520 and 530.

Although the present disclosure has been described with reference to specific features and embodiments thereof, it is evident that various modifications and combinations can be made thereto without departing from the disclosure. The specification and drawings are, accordingly, to be regarded simply as an illustration of the invention as defined by the appended claims, and are contemplated to cover any and all modifications, variations, combinations or equivalents that fall within the scope of the present disclosure.

What is claimed is:

1. A processing element (PE) in a configurable hardware accelerator (CHA), the PE comprising:
    a CHA engine including:
        a multiplexor configured to receive a process and to decompose the process into a plurality of threads; and
        K processors coupled to the multiplexor, K being greater than or equal to two, each processor of the K processors including M cores, M being greater than or equal to two, each core of the M cores comprising respective hardware elements, one core of the M cores configured to receive a program and to execute the program to configure the respective hardware elements of the other cores of the M cores to each execute one respective thread of the plurality of threads of the process;
    M PE local memory banks, each PE local memory bank of the M PE local memory banks being associated with a respective core of the M cores of each respective processor of the K processors; and
    a control block for controlling an access from each individual core of the M cores of each processor of the K processors to the PE local memory bank of the M PE local memory banks associated with the individual core.

2. The PE of claim 1 wherein the number of M PE local memory banks is equal to a number of parallel threads supported by the M cores.

3. The PE of claim 1 wherein one or more threads of the plurality of threads include instructions executed by the M cores and data processed by the M cores.

4. The PE of claim 1 wherein the control block is configured to generate addresses used to:
    address configuration instructions; and
    address data;
    the address configuration instructions and the address data being stored in a respective local memory bank of the M PE local memory banks.

5. The PE of claim 3 wherein the data processed by the M cores includes one of:
    N data packets corresponding to a number of parallel threads executed by the M cores; and
    N results corresponding to the number of parallel threads executed by the M cores.

6. The PE of claim 1 wherein the control block is configured to generate addresses used by the M cores to write respective results into the respective M PE local memory banks.

7. The PE of claim 1 wherein the K processors are daisy-chain connected to form a daisy-chain, wherein an output stream of a first processor of the K processors in the daisy-chain is connected to an input stream of a second adjacent processor of the K processors in the daisy-chain.

8. A configurable hardware accelerator (CHA), the CHA comprising:
    a plurality of processing elements (PEs), each PE of the plurality of PEs comprising:
        a CHA engine including K processors, each processor including M configurable cores with each of the M configurable cores configured in hardware for execution of a thread of the process;
        M PE local memory banks, with each of the M cores associated with one of the M PE local memory banks; and
        a control block for controlling each one of the M configurable core's access to its respective one of the M PE local memory banks; and
    a non-transitory memory, the non-transitory memory configured to store a PE virtual group function code (VGFC) table, the PE VGFC table configured to define one or more PE virtual groups (PEVGs) of the plurality of PEs wherein each of the PEVGs is configured in hardware for execution of a process.

9. The CHA of claim 8, the CHA further comprising a system interconnect (SI) and wherein the PE VGFC table includes one or more pointers wherein each pointer addresses one PE program and the one or more PE programs addressed by the one or more pointers are used to configure the SI so that each PE of the plurality of PEs can communicate with the one of more other PEs and the non-transitory memory;
    wherein each PE includes M core and M PE local memory banks, with each of the M cores being associated with one of the M local memory banks.

10. The CHA of claim 8 wherein the execution of the process includes executing the thread of the process.

11. The CHA of claim 8 wherein the PE VGFC table is used to configure each PE included in the plurality of PEs to communicate with the one or more other PEs included in the same PEVG.

12. The CHA of claim 8 wherein the VGFC table includes one or more PE enable fields to use to select one or more PEs to include in the PEVG.

13. The CHA of claim 8 wherein the plurality of PEs are daisy-chain connected for processing one or more threads of the same process.

14. The CHA of claim 13 wherein the daisy-chain connected plurality of PEs are PEs wherein an output stream of a first PE included in the plurality of PEs is connected to an input stream of a second adjacent PE included in the one or more other PEs included in the plurality of PEs.

15. The CHA of claim 8 wherein the plurality of PEs use direct memory access (DMA).

16. The CHA of claim 15 wherein the result generated by a first PE included in the plurality of PEs using DMA is written directly into the local shared data/instruction memory (SDIM) of a second PE included in the one or more other PEs included in the plurality of PEs using DMA.

17. The CHA of claim 8 wherein a single cluster PEVG of the one or more PEVGs is comprised of the plurality of PEs of the single cluster and the one or more other PEs included in the plurality of PEs included in the same single cluster.

18. The CHA of claim 8 wherein a single cluster includes the one or more PEVGs.

19. The CHA of claim 8 wherein a plurality of clusters of the one or more PEVGs is comprised of the plurality of PEs of a first cluster and the one or more other PEs included in the plurality of PEs of a second cluster wherein the first cluster and the second cluster are different clusters.

20. A method comprising:
    processing, by a first processing element (PE), a PE virtual group function code (VGFC) table row wherein a functional code field included in the VGFC table row is enabled;
    configuring, by the first PE, a second PE enabled by a PE enable field included in the VGFC table row processed by the first PE; and
    configuring the second PE using a PE program addressed by a memory address included in the PE program address field of the VGFC table, wherein:
        the first PE and the second PE each comprise:
        a CHA engine including K processors for executing a process, each processor including M configurable cores with each of the M configurable cores configured in hardware for execution of a thread of the process;
        M PE local memory banks, with each of the M cores associated with one of the M PE local memory banks; and
        a control block for controlling each one of the M configurable core's access to its respective one of the M PE local memory banks.

* * * * *